United States Patent [19]
Shiga

[11] Patent Number: 5,781,599
[45] Date of Patent: Jul. 14, 1998

[54] PACKET RECEIVING DEVICE

[75] Inventor: Tomohisa Shiga, Tokyo, Japan

[73] Assignee: Sony Corporation, Tokyo, Japan

[21] Appl. No.: 524,214

[22] Filed: Sep. 6, 1995

[30] Foreign Application Priority Data

Sep. 22, 1994 [JP] Japan .................. 6-254687

[51] Int. Cl.[6] ........................................ H03D 3/24
[52] U.S. Cl. ...................... 375/376; 370/503; 375/355
[58] Field of Search ........................... 375/354, 364, 375/373, 376, 355, 371, 327; 370/498, 503, 508, 509, 512, 516, 517; 348/518, 500; 358/425; 455/260

[56] References Cited

U.S. PATENT DOCUMENTS 5,566,174  10/1996  Sato et al. .
5,633,871   5/1997  Bloks ........................ 370/471
5,640,392   6/1997  Hayashi ..................... 370/395

OTHER PUBLICATIONS

IEEE Standards Draft, "Annex C. Cable Operation and Implementation Examples (informative)", In *High Performance Serial Bus*, P1394/Draft 6.4v0, Oct. 14, 1993, (IEEE).

*Primary Examiner*—Wellington Chin
*Assistant Examiner*—Jean B. Corrielus
*Attorney, Agent, or Firm*—Jay H. Maioli

[57] ABSTRACT

An apparatus for receiving and decoding a packet of a multiplexed bit stream whose data is coded in a predetermined format, includes a temporary storage memory for compensating for the difference between the timing of the received packet and the read-in timing of the coded data by a decoder, counters and a comparison circuit for producing a clock signal which serves as a reference for operating the decoder on the basis of a reference signal in the predetermined format, and a calculation circuit for calculating the position of the reference signal using a time which is periodically added to the packet.

2 Claims, 5 Drawing Sheets

— P1394 SERIAL BUS

CSP : CYCLE START PACKET
Iso : ISOCHRONOUS DATA PACKET
Async : ASYNCHRONOUS DATA PACKET PID : PROGRAM ID
PCR : Program Clock Reference

1

PACKET RECEIVING DEVICE

BACKGROUND OF THE INVENTION

1. Field of the Invention

The present invention relates to a device for receiving and reproducing a packet having a multiplexed transport stream of MPEG by using a communication control bus which is based on IEEEP-1394 (hereinafter referred to as the "P1394 serial bus").

2. Description of the Related Art

There has been hitherto proposed a system in which a plurality of equipments is connected to one another through a P1394 serial bus and communication is performed among these pieces of equipment.

FIG. 1 shows such a system as described above. The system includes three digital video tape recorders (VTR 1 to 3), a digital cam corder (CAM), and a digital television receiver (FTV1). These pieces of equipment are connected to one another through a P1394 serial bus cable. Each piece of equipment has a function of relaying an information signal and a control signal, which are input from the P1394 serial bus cable, so that the communication system is equivalent to a communication system in which the respective pieces of equipment are connected to a common P1394 serial bus.

Data transmission through the pieces of equipment having the common bus is performed in a time-divisional multiplexing mode every predetermined communication cycle (125 μsec, for example) as shown in FIG. 6. The communication cycle on the bus is managed by a predetermined piece of equipment which is called as "cycle master", and the data transmission of a communication cycle is started in synchronism with transmission of a synchronizing packet representing the start time of the communication cycle (cycle start packet) from the cycle master to another piece of equipment on the bus. The cycle master is automatically determined by a method defined in IEEE-P1394 when respective pieces of equipment are connected through a P1394 serial bus to construct a communication system.

Data transmission in a communication cycle is made up of two types of data, synchronizing type (Isochronous) data such as video data, audio data, etc., and non-synchronizing (Asynchronous) data such as connection control commands, etc. The isochronous data packets are transmitted prior to the asynchronous data packets. Plural isochronous data can be discriminated from one another by numbering the respective isochronous data packets with channel numbers 1, 2, 3, . . . , N. The asynchronous data packets are transmitted for a period from the end of the transmission of the isochronous data packets of all channels to be transmitted until a next cycle start packet.

In the communication system thus constructed, it is now considered the MPEG transport packets of plural programs are transmitted while multiplexed in an isochronous data packet of one channel.

As shown in FIG. 3, the MPEG transport packet has a length of 188 bytes, and it comprises a link header, an adaptation header and a pay-load (data portion). The link header is provided with a program ID. The adaptation header is provided with a Program Clock Reference (hereinafter referred to as "PCR") from a position corresponding to a second byte from the head thereof.

The program ID is a code for identifying a program, and the PCR serves as a reference (time base) for the extracting time of the data of each program at a reception side when the stream of the MPEG transport packets of plural programs is transmitted while multiplexed in an isochronous data packet of one channel. When it is required to receive a desired program, at the reception side an MPEG transport stream is formed from the isochronous data packet which is received through the P1394 serial bus. The PCR corresponding to the desired program is read out from the transport stream, and a PLL for generating clock signals of 27 MHz to be supplied to an MPEG decoder is locked.

However, this method needs the total capacity of two PLLS, one of which is used to generate clock signals to read out a transport stream, and the other of which is to generate clock signals of 27 Mh to be output to the decoder. Furthermore, this method further needs two FIFOs, one of which is to form a transport stream from a received isochronous data packet, and the other of which is to compensate for the difference between the timing of the transport stream and the data read-in timing of the decoder.

The following eight relating applications have been filed by the same applicant:

1. European Laid-open Application No: 0614297
2. Japanese Application No.: 05126682
3. Japanese Application No.: 05200055
4. Japanese Application No.: 06051246
5. Japanese Application No.: 06134940
6. Japanese Application No.: 06165883
7. Japanese Application No.:06192807
8. Japanese Application No.: 06242255

The corresponding U.S. Applications to these applications are now pending in U.S.

SUMMARY OF THE INVENTION

An object of the present invention is to provide a packet receiving device for decoding a transport stream of MPEG having plural multiplexed programs by a single PLL and a single FIFO.

In order to attain the above object, an apparatus for receiving and decoding a packet of a multiplexed stream whose data is coded to a predetermined format, includes a temporarily storing means for compensating for the difference between the timing of the received packet and the read-in timing of the coded data by a decoder, a means for producing a clock signal serving as a reference to operate the decoder on the basis of a reference signal in the predetermined data format, and a means for calculating the position of the reference signal using a time which is periodically added to the packet.

The data stream of a single program extracted from the received packet is written in the temporarily storing means. The data stream extracted from the received packet is supplied to the decoder through the temporarily storing means.

Furthermore, the means of producing the clock signal to operate the decoder has a single PLL. The means of calculating the position of the reference signal comprises a first means for calculating the time difference between the time of the reference signal, based on the position information in the predetermined format of the data extracted from the received packet, and the periodical position information in the data stream, and a second means for converting the time difference into the number of clocks in a transmission path.

The second means comprises a first counter for counting the clock signal of the data stream, a second counter for counting the clock signal in the transmission path, and a latch for latching the output value of the second counter when the time difference calculated by the first means is coincident with the output value of the first counter.

According to the present invention, the difference between the timing of the received packet and the data read-in timing of the decoder is compensated by the temporarily storing means. The clock signal to operate the decoder is produced on the basis of the reference signal of the predetermined format which is extracted from the received packet. The position of the reference signal is calculated using the time which is periodically added to the packet.

Therefore, according to the present invention, at the reception side the reference signal can be read out and the clock signal to operate the decoder can be produced without reproducing the stream of the data which is coded in a predetermined format. Accordingly, PCR can be read out from the MPEG transport stream transmitted using a P1394 serial bus without reproducing the transport stream at the reception side, thereby producing clock signals of 27 MHz for operating the decoder.

Furthermore, according to the present invention, the reception of the packet of the multiplexed stream of data which is coded in a predetermined format at the transmission side and the decoding of the data can be performed by a receiving device having a single temporarily storing means and a single PLL.

DETAILED DESCRIPTION OF THE PREFERRED EMBODIMENTS

An embodiment in which a transport bit stream of 19.3 MHz having five multiplexed programs is transmitted with an isochronous data packet on the P1394 serial bus, and received in order to extract an indicated program from the received transport bit stream and convert it to a video signal in a NTSC system will be described in the following item order:

(1) Timing of Transmission side, (2) Timing of Reception side, (3) Receiving Device and (4) Modification of Receiving Device

[1] Timing of Transmission side

Figure 4:
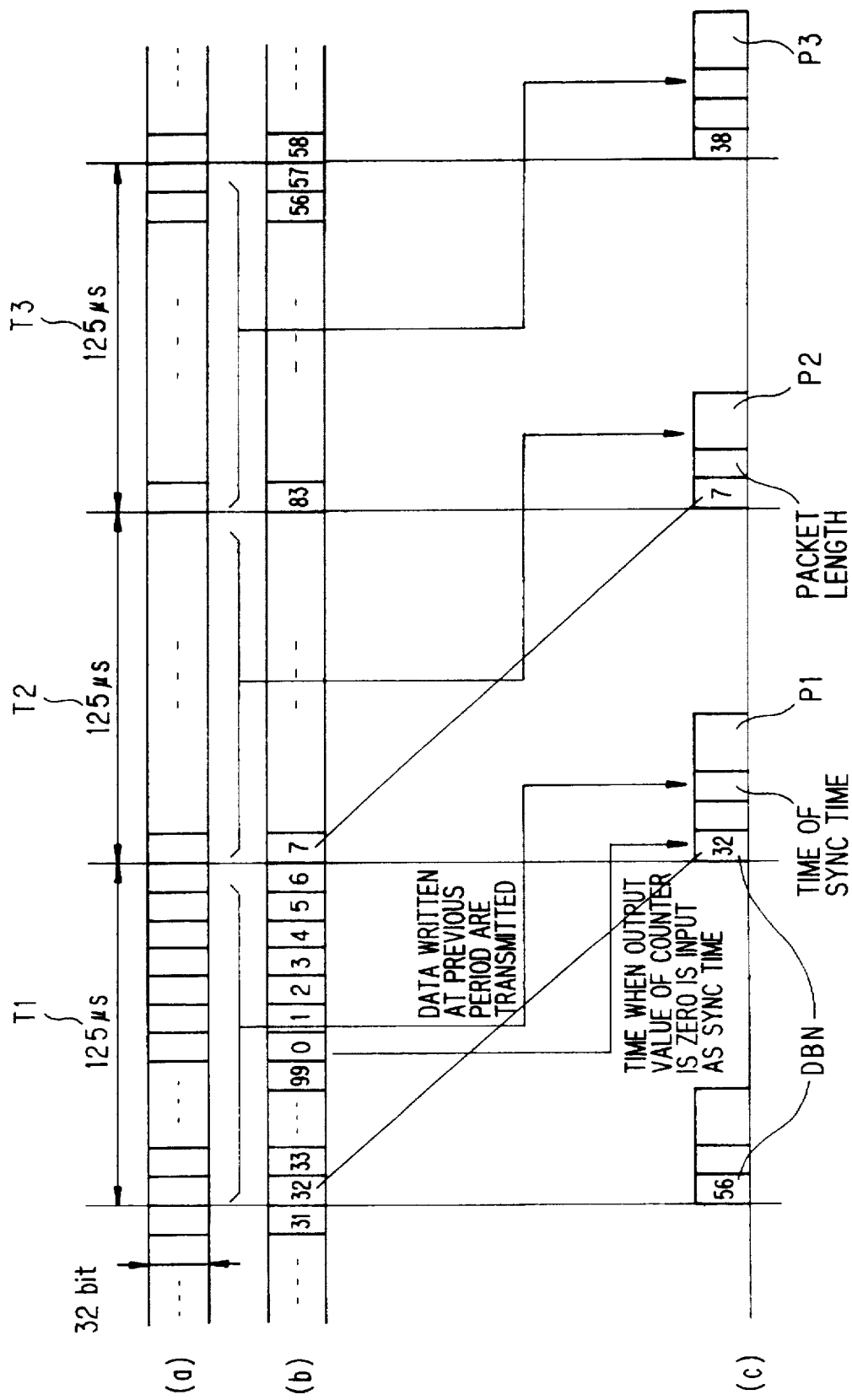
FIG. 4 is a diagram showing the timing of a signal at a transmission side in an embodiment according to the present invention.

The timing of the transmission side will be described with reference to FIG. 4. In FIG. 4, (a) represents an input transport bit stream, (b) represents data block numbers (which will be described in detail later, and is hereinafter referred to as "DBN"), and (c) represents a packet to be transmitted.

In the P1394 serial bus, a packet is output every 125 μs as shown in FIG. 4, and the input transport bit stream is transmitted while packetted every 125 μs as a packet unit. In this embodiment, a transport bit stream which is written in a FIFO (not shown) of a transmission device during a cycle T1 is transmitted as a packet P1, and a transport data stream which is written during a cycle T2 is transmitted as a packet P2.

It is usually favorable in the P1394 serial bus that data are transmitted every one quadrate (32 bits), and thus the input transport bit stream is converted to parallel data of one quadrate by a serial/parallel converter in the transmitting device. (a) of FIG. 4 shows a transport bit stream after conversion to parallel data of one quadrate.

Each of the packets which are transmitted by the P1394 serial bus is provided with a packet length and DBN. In this embodiment, the input transport bit stream is assumed to be a virtual assembly of bit array which is repeated at a constant cycle. That is, a transport bit stream which realistically has no constant cycle or is repeated at different cycles is regarded as an assembly of bit array which is repeated at a constant cycle and virtually framed. The framing of the transport bit stream is performed by a counter which operates at the same rate as the bit rate of the input transport bit stream. The output value of the counter corresponds to the DBN shown in (b) of FIG. 4. The DBN represents the output value of the counter for counting quadrate, which is written at the head of each packet.

There are two groups of packets, each packet of one group being provided with a sync time (Sync Time) while each packet of the other group is provided with no sync time. The provision of the sync time to a packet is determined on the basis of a judgment as to whether data having "0" as the DBN is contained in the data which are transmitted by the packet. The sync time is defined as a time which is indicated by a cycle timer of the P1394 serial bus when the DBN is equal to zero. The cycle timer is provided in each piece of equipment, and it has a time which cycles at a predetermined rate (128 seconds, for example).

The clock signals at the transmission side and the reception side are independent of each other, and are not synchronous with each other, so that an error between the clock signals is accumulated and a time lag is gradually increased between the write-in rate of the bit stream into the FIFO at the transmission side and the read-out rate of the bit stream from the FIFO at the reception side. The sync time is used as information to adjust this time lag.

Only one sync time must be provided in one packet, and thus the counter which performs the framing must be set to be longer than the cycle of P1394 serial bus (125 μs). In this embodiment, a counter whose cycle is substantially equal to 167 μs, for example, a counter which cycles by counting a clock signal of 600 kHz at 100 times, is used.

During the cycle T1 in FIG. 4, DBN is equal to zero, so that a sync time is provided to the packet P1. Likewise, since DBN is equal to zero during the cycle T3, a sync time is provided to the packet P3. However, DBN is not equal to zero during the cycle T2, so no sync time is provided to the packet P2.

[2] Timing of Reception Side

Figure 5:
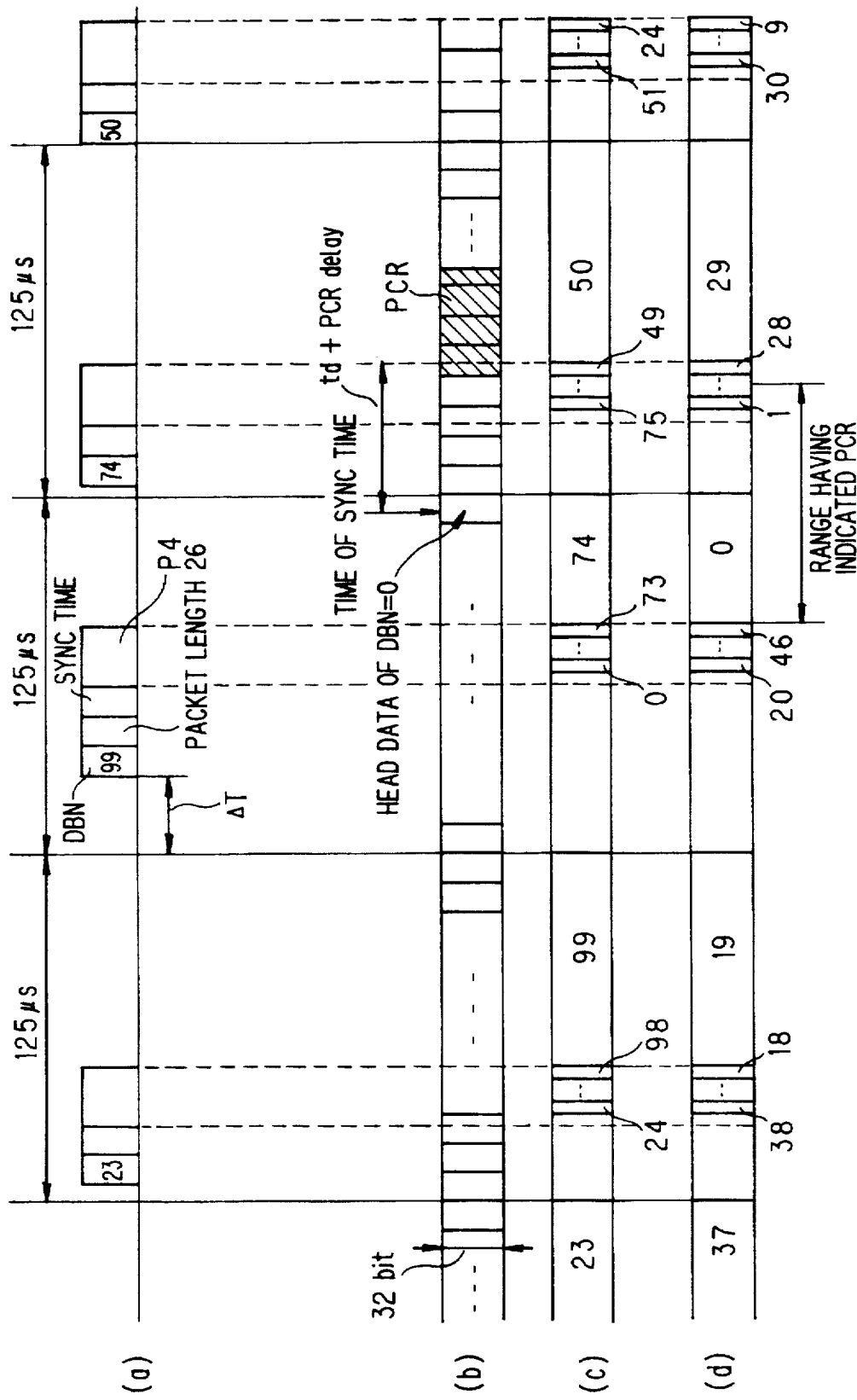
FIG. 5 is a diagram showing the timing of a signal at a reception side in the embodiment according to the present invention.

Next, the timing of the reception side will be described with reference to FIG. 5. In FIG. 5, (a) represents a received packet, (b) represents a virtual transport bit stream, (c) represents an output value of a counter for outputting DBN, and (d) represents an output value of a packet counter. (a), (b) and (d) are associated with the time axis direction, however, (b) is not associated with the time axis direction.

Figure 2:
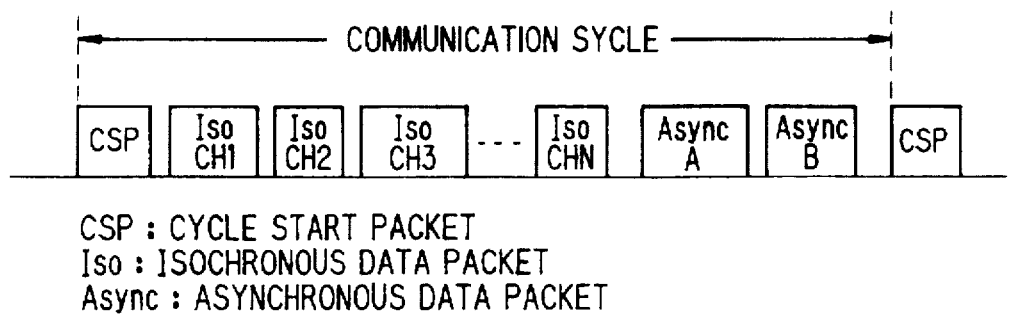
FIG. 2 is a diagram showing a communication cycle in the P1394 serial bus.
Figure 3:
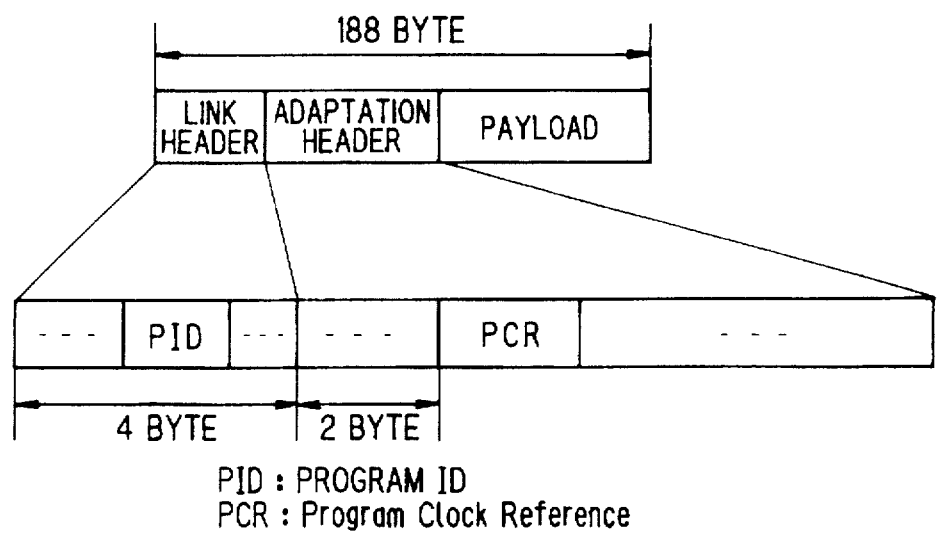
FIG. 3 is a diagram showing a transport packet of MPEG.

The reception side is provided with a counter for outputting DBN (hereinafter referred to as "DBN counter") and a counter for indicating the position of a transport packet in the received packet. The output values of these counters are shown in (c) and (d) of FIG. 2, respectively.

Upon reception of a packet, the DBN and the output value of the packet counter are incremented by "1" every time data of one quadrate is read out from the packet. Since the complete cycle of the DBN is equal to 100, a value next to 99 is equal to zero. The output value of the packet counter which is subsequent to 46 is equal to zero. This is because the length of the transport packet is set to 47 quadrates (188 bytes) by MPEG.

When the DBN is read out from the received packet, the output value of the DBN counter is forcedly set to the DBN which is written in the packet. For example, DBN=99 is written in the packet P4 of FIG. 5, so that the DBN counter is forcedly set to 99. If the DBN counter operates normally, the output value of the DBN counter would be set to 99 at the time when receiving the DBN of packet P4.

At the reception side, a time at which the PCR as described above should be reproduced is calculated using the output value of the DBN counter, the output value of the packet counter and the sync time to reproduce a clock signal of 27 MHz which is coincident with that at the transmission side. This calculation method will be described below.

Figure 7:
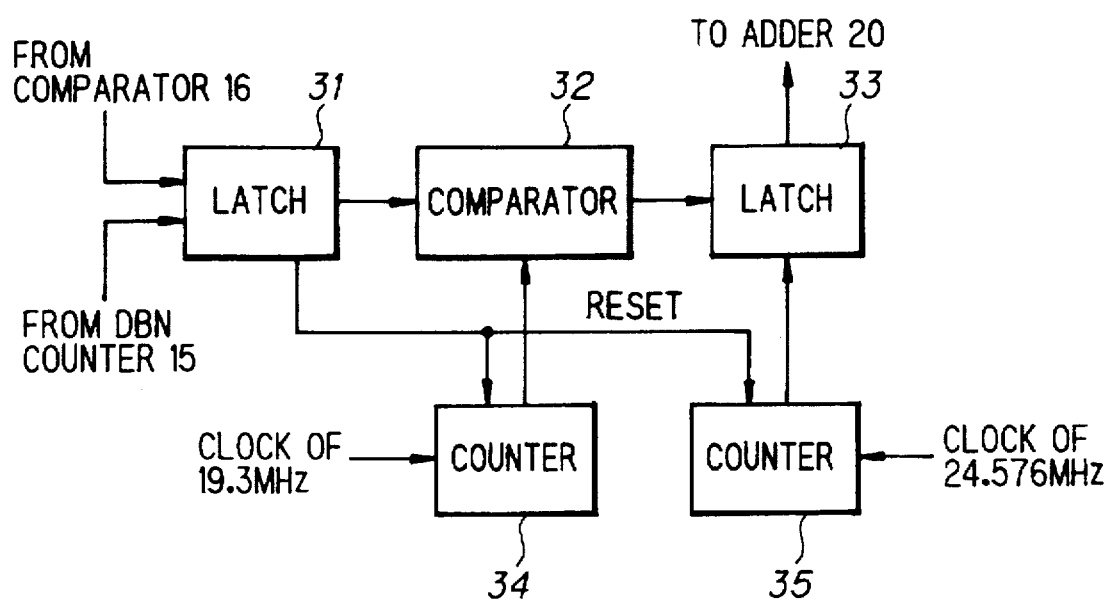
FIG. 7 is a block diagram showing a modification of the receiving device of the present invention.

First, the program ID of the transport bit stream is read out, and it is checked whether a currently read-out program is an indicated program. If it is judged to be the indicated program, the value of the DBN at which the output value of the packet counter is equal to 1 is read out. This is because the PCR is written at a second quadrate position of the transport packet as shown in FIG. 7.

The value of the DBN counter at this time is equal to the number of quadrates from the sync time written in the received packet. Accordingly, if this value is multiplied by the length of one cycle of the clock signal which is synchronized with the transport bit stream, the period from the time indicated by the sync time until PCR can be calculated. Furthermore, by converting this time to the clock number at 24.576 MHz of the reference clock signal of the P1394 serial bus and adding the obtained value to the sync time, the time at which the PCR should be reproduced can be calculated. This situation is shown by the virtual transport bit stream shown in (b) of FIG. 5. The virtual transport bit stream is introduced for convenience's sake of the description, and actually the transport bit stream is not reproduced in the receiving device.

[3] Receiving Device

Figure 1:
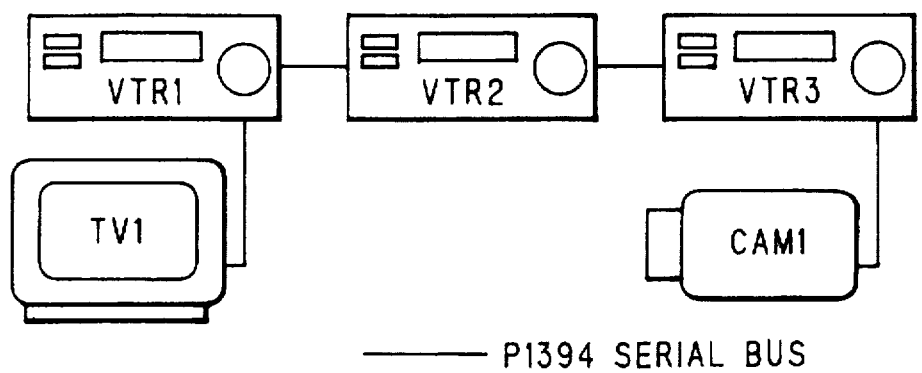
FIG. 1 is a diagram showing a communication system using a P1394 serial bus.

Next, the receiving device will be described with reference to the block diagram of FIG. 6. The receiving device (the transmitting device as described above) is provided in each piece of equipment in the case of a communication system as shown in FIG. 1. The output of the receiving device is transmitted to a video data processing block of each piece of equipment.

The packet which is transmitted through the P1394 serial bus 1 is received by a P1394 interface (hereinafter referred to as "P1394 I/F") 2, and output to a program extraction circuit 3, a PCR extraction circuit 4, a sync time extraction circuit 5, a packet counter 6, a program ID extraction circuit 7 and a DBN extraction circuit 8.

The program extraction circuit 3 extracts a program indicated by a program number PGN, and writes it into a FIFO 9. The program which is written in the FIFO 9 is converted to a serial bit stream by a parallel/serial conversion circuit 10, and then output to a system layer processing block 11. The program is subjected to processing in the system layer of the MPEG, whereby the bit stream is converted to a format which is conformable to the decoder 12.

The decoder 12 reads data from the system layer processing block 11 in synchronism with the clock signal of 27 MHz which is input from the PLL 13, and outputs the data to an NTSC encoder 14. The NTSC encoder 14 outputs video signals of the NTSC system to a video data processing block.

The DBN extraction circuit 8 extracts DBN from the packet, and outputs it to the DBN counter 15. When DBN is input from the DBN extraction circuit 8 to the DBN counter 15, the DBN is set in the DBN counter 15, and at the other times, the DBN counter 15 counts up every time the P1394 I/F 2 outputs data of one quadrate. The DBN counter operates at a cycle of 100.

The packet counter 6 outputs the current quadrate position of a transport packet indicated by the program number PGN from the transport bit stream in the received packet by performing the frame synchronization.

When the value of the packet counter 6 is equal to 1 and the output value of the program ID extraction circuit 7 is equal to the program number PGN, a comparison circuit 16 outputs a comparison result to a latch 17. As described above, the program ID is an inherent value which is provided in every transport packet and in every program.

When receiving an input from the comparison circuit 16, the latch 17 latches the output value of the DBN counter 15 at that time, and outputs it to a calculation circuit 18. The DBN at this time is equal to the quadrate number from the time indicated by the sync time written in the received packet until the PCR.

In the calculation circuit 18, the above value is multiplied by 53 ns, which corresponds to one cycle of the clock signal synchronized with the transport bit stream, and divided by 41 ns, which corresponds to one cycle of 24.576 MHz which is the reference clock signal of the P1394 serial bus uses to convert the time until the PCR to the clock number in the P1394 serial bus.

The sync time extraction circuit 5 extracts a sync time ts from the transport packet, and outputs it to an adder 19. The adder 19 adds the sync time ts with a predetermined delay time td, and outputs the result to an adder 20. In this case, the delay time td is added to the sync time ts because the time of the sync time written in the packet corresponds to the time at the transmission side and thus it has already passed over the time of the sync time due to jitter θT of the packet or the like at the time when the packet is received at the reception side and the data written in the packet is read out as a bit stream. The jitter inherently occurs when the P1394 serial bus is used.

The adder 20 adds the output of the adder 19 with the output of the calculation circuit 18, and outputs the addition result to a comparison circuit 21. The comparison circuit 21 compares the output values of the cycle timer 23 and the adder 20 with each other, and outputs the comparison result to latches 23 and 24 when the output values are equal to each other.

The PCR extraction circuit 4 extracts PCR which is located at the second quadrate position of the transport packet. The PCR extracted by the PCR extraction circuit 4 on the basis of the output of the comparison circuit 21 is latched by the latch 23, and the output of the counter 25 is latched by the latch 24. The counter 25 operates with the clock signal of 27 MHz which is output by the PLL 13, and also operates according to the same algorithm as the PCR generated at the transmission side.

A subtraction circuit 26 calculates the difference between the input values from the latch 23 and the latch 24, and outputs the difference to the PLL 13. A target to be latched by the latch 23 is the PCR which is prepared at the transmission side. On the other hand, a target to be latched by the latch 24 is the PCR which is prepared at the reception side. The PLL 13 adjusts the phase of the output clock signal in accordance with the output of the subtraction circuit 26 so that the output of the latch 24 is coincident with the output of the latch 23. With this processing, the phase of the PCR prepared in the counter at the reception side can be matched with the phase of the PCR prepared at the transmission side, so that synchronization can be established between the clock signal of the PLL 13 and the clock signal of the transmission side.

[4] Modification of Receiving Device

A modification of the receiving device will be described with reference to FIG. 7. In the following description, only the portion different from FIG. 6 will be described.

Figure 6:
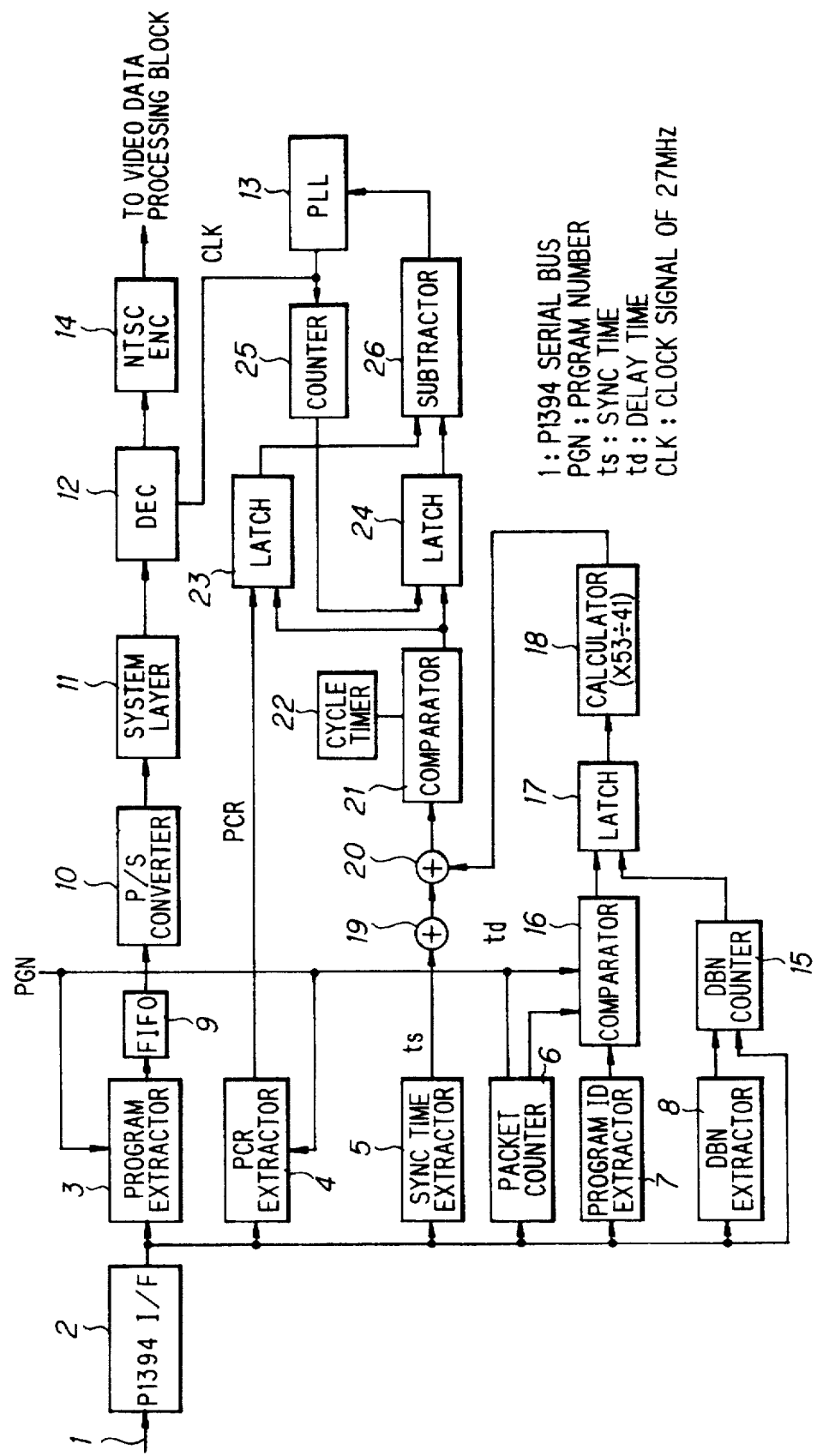
FIG. 6 is a block diagram showing a receiving device in the present invention.

Like the latch 17 of FIG. 6, a latch 31 is input with the output of the DBN counter 15 and the output of the comparison circuit 16. The latch 31 outputs a latched value to a comparison circuit 32 and resets counters 34 and 35 in synchronism with its latch timing.

The counter 34 counts up with a clock signal of 19.3 MHz which is synchronized with the transport bit stream of MPEG, and the counter 35 counts up with a clock signal of 24.576 MHz which is a clock signal of the P1394 serial bus.

The comparison circuit 32 outputs a signal to the latch 33 when the output of the counter 34 and the output of the latch 31 are coincident with each other, and the latch 33 latches the output value of the counter 35 at that time. As a result, the output of the latch 33 is equal to the output of the calculation circuit 18 of FIG. 6.

According to this modification, the calculation of the calculation circuit 18 of FIG. 6 can be performed with a simple piece of hardware. In addition, even when only a specific program is selected and transmitted at the transmission side, the same effect can be obtained.

What is claimed is:

1. An apparatus for receiving and decoding a packet of a multiplexed bit stream whose data is coded to a predetermined format, comprising:

temporary storing means for compensating for the difference between the timing of the received packet and a read-in timing of the coded data to a decoder, wherein a data bit stream of a signal program extracted from the received packet is written in said temporary storing means, and wherein the data bit stream extracted from the received packet is supplied to the decoder through said temporary storing means;

means for producing a clock signal serving as a reference to operate the decoder on the basis of a reference signal in the predetermined format, wherein said means of producing a clock signal to operate the decoder has a single phase-locked-loop (PLL); and means for calculating the position in time of the reference signal using a time which is periodically added to the packet, wherein said means for calculating the position in time of the reference signal comprises first means for calculating a time difference between the time of the reference signal from when it is transmitted and received on the basis of the position timing information in the predetermined format of the data extracted from the received packet and the periodical position timing information in the transmitted bit stream and second means for converting said time difference into the number of clock cycle signals in the transmission path.

2. The apparatus as claimed in claim 1, wherein said second means comprises a first counter for counting a clock signal of the data bit stream, a second counter for counting a clock signal in the transmission path, and a latch for latching the output value of said second counter when the time difference calculated by said first means coincides with the output value of said first counter.

* * * * *